US010327035B2

(12) United States Patent
Zerr et al.

(10) Patent No.: US 10,327,035 B2
(45) Date of Patent: Jun. 18, 2019

(54) SYSTEMS AND METHODS FOR ASSOCIATING COMMUNICATION DEVICES WITH OUTPUT DEVICES

(71) Applicant: SONIFI Solutions, Inc., Sioux Falls, SD (US)

(72) Inventors: Derin M. Zerr, Kahului, HI (US); Joel Walter Zdepski, Mountain View, CA (US); Shaun Eugene Marko, Oak Park, IL (US); Andy Loren Anderson, Sioux Falls, SD (US)

(73) Assignee: SONIFI SOLUTIONS, INC., Sioux Falls, SD (US)

( * ) Notice: Subject to any disclaimer, the term of this patent is extended or adjusted under 35 U.S.C. 154(b) by 0 days.

(21) Appl. No.: 15/459,394

(22) Filed: Mar. 15, 2017

(65) Prior Publication Data

US 2017/0272819 A1 Sep. 21, 2017

Related U.S. Application Data

(60) Provisional application No. 62/402,762, filed on Sep. 30, 2016, provisional application No. 62/308,442, filed on Mar. 15, 2016.

(51) Int. Cl.
*H04N 21/475* (2011.01)
*H04N 21/254* (2011.01)
(Continued)

(52) U.S. Cl.
CPC ..... *H04N 21/4753* (2013.01); *H04N 21/2143* (2013.01); *H04N 21/2541* (2013.01);
(Continued)

(58) Field of Classification Search
CPC combination set(s) only.
See application file for complete search history.

(56) References Cited

U.S. PATENT DOCUMENTS 4,198,870 A 4/1980 Barker et al.
4,564,732 A 1/1986 Lancaster et al.
(Continued)

FOREIGN PATENT DOCUMENTS

CA 2788573 11/2012
CA 2790354 3/2013
(Continued)

OTHER PUBLICATIONS

"DIAL Discovery and Launch protocol specification," Netflix, Inc., 2012, Version 1.6.4, 16 pages.
(Continued)

*Primary Examiner* — Alexander Gee
(74) *Attorney, Agent, or Firm* — Sheridan Ross P.C.

(57) ABSTRACT

Systems and methods for pairing user devices to selected output devices are provided. Pairing can include providing information identifying a user device to a system authority, such as a remote communication interface server. In response to verifying that a user associated with the identified user device is authorized to use a selected output device, the information identifying the user device and a local player connected to the selected output device is provided to a local controller or server. The local controller then creates and maintains an association between the user device and the local player, allowing a user of the user device to cast content to an output device associated with the paired local player.

10 Claims, 6 Drawing Sheets

(51) Int. Cl.
*H04N 21/214* (2011.01)
*H04N 21/436* (2011.01)
*H04W 76/14* (2018.01)
*H04W 8/00* (2009.01)

(52) U.S. Cl.
CPC ...... *H04N 21/43615* (2013.01); *H04W 76/14* (2018.02); *H04W 8/005* (2013.01)

(56) References Cited

U.S. PATENT DOCUMENTS

| | | |
|---|---|---|
| 5,374,952 A | 12/1994 | Flohr |
| 5,455,619 A | 10/1995 | Truckenmiller et al. |
| 5,506,572 A | 4/1996 | Hills et al. |
| 5,641,319 A | 6/1997 | Stoel et al. |
| 5,675,828 A | 10/1997 | Stoel et al. |
| 5,905,942 A | 5/1999 | Stoel et al. |
| 5,907,715 A | 5/1999 | Stoel et al. |
| 6,226,677 B1 | 5/2001 | Slemmer |
| 6,240,533 B1 | 5/2001 | Slemmer |
| 6,343,315 B1 | 1/2002 | Stoel et al. |
| 6,377,990 B1 | 4/2002 | Slemmer et al. |
| 6,594,692 B1 | 7/2003 | Reisman |
| 7,272,844 B1 | 9/2007 | Bankers et al. |
| 7,380,031 B2 | 5/2008 | Jones et al. |
| 7,444,663 B2 | 10/2008 | Fenwick, Jr. et al. |
| 7,895,630 B2 | 2/2011 | McKenna et al. |
| 7,930,721 B1 | 4/2011 | Hernes |
| 7,971,782 B1 | 7/2011 | Shams |
| 8,214,429 B2 | 7/2012 | Chidel et al. |
| 8,356,251 B2 | 1/2013 | Strober |
| 8,434,111 B2 | 4/2013 | Levy et al. |
| 8,572,662 B2 | 10/2013 | Cassidy et al. |
| 8,578,418 B2 | 11/2013 | Levy et al. |
| 8,713,612 B2 | 4/2014 | Levy et al. |
| 8,732,753 B2 | 5/2014 | Warrick |
| 8,854,195 B2 | 10/2014 | West et al. |
| 8,903,978 B2 | 12/2014 | Zerr et al. |
| 9,032,451 B2 | 5/2015 | Cansino et al. |
| 9,107,055 B2 | 8/2015 | Zerr et al. |
| 9,326,095 B2 | 4/2016 | Yu et al. |
| 9,369,829 B2 | 6/2016 | Zerr et al. |
| 2002/0052965 A1 | 5/2002 | Dowling |
| 2003/0090386 A1 | 5/2003 | Giraldin et al. |
| 2003/0229900 A1 | 12/2003 | Reisman |
| 2004/0261110 A1 | 12/2004 | Kolbeck et al. |
| 2005/0283791 A1 | 12/2005 | McCarthy et al. |
| 2006/0107299 A1 | 5/2006 | Bartfeld et al. |
| 2006/0117379 A1 | 6/2006 | Bennett et al. |
| 2006/0123053 A1 | 6/2006 | Scannell, Jr. |
| 2006/0153122 A1 | 7/2006 | Hinman et al. |
| 2006/0277312 A1 | 12/2006 | Hirsch |
| 2007/0080934 A1 | 4/2007 | Chen et al. |
| 2007/0155326 A1 | 7/2007 | Lin et al. |
| 2007/0157281 A1 | 7/2007 | Ellis et al. |
| 2008/0060081 A1 | 3/2008 | Van Den Heuvel |
| 2008/0141313 A1* | 6/2008 | Kato .................. H04N 7/1675 725/62 |
| 2008/0151847 A1 | 6/2008 | Abujbara |
| 2008/0168129 A1 | 7/2008 | Robbin et al. |
| 2008/0207170 A1 | 8/2008 | Khetawat et al. |
| 2009/0007240 A1 | 1/2009 | Vantalon et al. |
| 2009/0083824 A1 | 3/2009 | McCarthy et al. |
| 2009/0125971 A1 | 5/2009 | Belz et al. |
| 2009/0144815 A1 | 6/2009 | Vrielink et al. |
| 2009/0158404 A1 | 6/2009 | Hahn et al. |
| 2009/0172780 A1 | 7/2009 | Sukeda et al. |
| 2010/0058485 A1 | 3/2010 | Gonzalez et al. |
| 2010/0069115 A1 | 3/2010 | Liu |
| 2010/0070997 A1 | 3/2010 | Friedman |
| 2010/0145859 A1 | 6/2010 | Murakami et al. |
| 2010/0162294 A1 | 6/2010 | Yin et al. |
| 2010/0165879 A1 | 7/2010 | Gupta et al. |
| 2010/0176919 A1 | 7/2010 | Myers et al. |
| 2010/0278345 A1 | 11/2010 | Alsina et al. |
| 2010/0330979 A1 | 12/2010 | Harris |
| 2011/0099598 A1 | 4/2011 | Shin et al. |
| 2011/0116452 A1 | 5/2011 | Welch et al. |
| 2011/0167486 A1* | 7/2011 | Ayloo .................. G06Q 10/00 726/7 |
| 2011/0244829 A1 | 10/2011 | Kase |
| 2011/0290893 A1 | 12/2011 | Steinberg |
| 2011/0314497 A1 | 12/2011 | Warrick et al. |
| 2012/0027374 A1 | 2/2012 | Lipkind |
| 2012/0072951 A1 | 3/2012 | King |
| 2012/0075538 A1 | 3/2012 | Okuda |
| 2012/0096503 A1 | 4/2012 | Slothouber et al. |
| 2012/0159472 A1 | 6/2012 | Hong et al. |
| 2012/0159538 A1 | 6/2012 | Phillips et al. |
| 2012/0166628 A1 | 6/2012 | Kullos |
| 2012/0166655 A1 | 6/2012 | Maddali et al. |
| 2012/0243444 A1 | 9/2012 | Hillier et al. |
| 2012/0249890 A1 | 10/2012 | Chardon et al. |
| 2012/0260268 A1 | 10/2012 | Mirkin |
| 2012/0272147 A1 | 10/2012 | Strober |
| 2012/0322384 A1* | 12/2012 | Zerr .................. H04W 76/10 455/41.3 |
| 2012/0324076 A1* | 12/2012 | Zerr .................. H04W 4/21 709/223 |
| 2013/0051237 A1 | 2/2013 | Ong |
| 2013/0081093 A1 | 3/2013 | Cassidy et al. |
| 2013/0091309 A1 | 4/2013 | Bjontegard et al. |
| 2013/0097286 A1 | 4/2013 | Robbin et al. |
| 2013/0124759 A1 | 5/2013 | Strober |
| 2013/0142181 A1 | 6/2013 | Makim et al. |
| 2013/0239199 A1 | 9/2013 | Ong |
| 2013/0297723 A1 | 11/2013 | Iwaniszyn |
| 2013/0298020 A1 | 11/2013 | Stoikos |
| 2013/0305320 A1 | 11/2013 | Warrick et al. |
| 2013/0305341 A1 | 11/2013 | Baker et al. |
| 2013/0339533 A1 | 12/2013 | Neerinex et al. |
| 2013/0339865 A1 | 12/2013 | Oslund et al. |
| 2013/0346564 A1* | 12/2013 | Warrick .............. H04L 41/0816 709/219 |
| 2013/0346808 A1 | 12/2013 | Gyorffy |
| 2013/0347028 A1 | 12/2013 | Warrick et al. |
| 2014/0026162 A1 | 1/2014 | Cassidy et al. |
| 2014/0051362 A1 | 2/2014 | Ding |
| 2014/0053246 A1 | 2/2014 | Huang et al. |
| 2014/0053282 A1 | 2/2014 | Court |
| 2014/0067828 A1 | 3/2014 | Archibong et al. |
| 2014/0089524 A1 | 3/2014 | Carriere |
| 2014/0090030 A1 | 3/2014 | Ong |
| 2014/0114919 A1 | 4/2014 | Woods |
| 2014/0143380 A1 | 5/2014 | Warrick et al. |
| 2014/0150031 A1 | 5/2014 | Kumar et al. |
| 2014/0189758 A1* | 7/2014 | Kozlowski ....... H04N 21/43637 725/81 |
| 2014/0189759 A1 | 7/2014 | Warrick et al. |
| 2014/0245395 A1 | 8/2014 | Hulse et al. |
| 2014/0250460 A1 | 9/2014 | Hulse et al. |
| 2014/0250470 A1 | 9/2014 | Warrick |
| 2014/0282751 A1 | 9/2014 | Lee et al. |
| 2014/0282921 A1 | 9/2014 | Filman et al. |
| 2014/0289410 A1 | 9/2014 | Smith et al. |
| 2014/0304722 A1 | 10/2014 | Ostlund |
| 2014/0331135 A1* | 11/2014 | Sukoff .................. H04L 65/60 715/719 |
| 2014/0347181 A1 | 11/2014 | Luna et al. |
| 2015/0147972 A1 | 5/2015 | Motto |
| 2015/0339274 A1 | 11/2015 | Pappu et al. |
| 2015/0350690 A1 | 12/2015 | Zerr et al. |
| 2015/0365512 A1* | 12/2015 | MacKenzie ........... H04W 12/08 455/420 |
| 2015/0373401 A1 | 12/2015 | Kwon et al. |
| 2015/0382195 A1* | 12/2015 | Grim .................. H04L 63/08 726/4 |
| 2016/0027399 A1 | 1/2016 | Wilde et al. |
| 2016/0073440 A1 | 3/2016 | Palten et al. |
| 2016/0249158 A1* | 8/2016 | Tredoux ............... H04L 43/16 |
| 2016/0255461 A1 | 9/2016 | Zerr et al. |
| 2016/0285877 A1 | 9/2016 | Anderson et al. |
| 2016/0323433 A1 | 11/2016 | Anderson et al. |

(56) References Cited

U.S. PATENT DOCUMENTS

| | | | |
|---|---|---|---|
| 2017/0094345 A1 | 3/2017 | Zerr et al. | |
| 2017/0094697 A1 | 3/2017 | Zdepski et al. | |
| 2017/0206593 A1* | 7/2017 | Zolotov | G06Q 30/0639 |
| 2018/0070200 A1 | 3/2018 | Zerr et al. | |

FOREIGN PATENT DOCUMENTS

| | | |
|---|---|---|
| CA | 2817932 | 12/2013 |
| CA | 2820654 | 12/2013 |
| CN | 203590374 | 5/2014 |
| EP | 0094839 | 11/1983 |
| WO | WO 2007/002604 | 1/2007 |
| WO | WO 2009/137247 | 11/2009 |
| WO | WO 2012/145227 | 10/2012 |

OTHER PUBLICATIONS

U.S. Appl. No. 14/503,858, filed Oct. 1, 2014, Zerr et al.
"Specification of the Bluetooth® System Version 4.2. Manual," Bluetooth SIG, Inc., Dec. 2014, 40 pages [retrieved on May 21, 2016 from https://www.bluetooth.com/specifications/adopted-specifications].
Erman et al. "Over the Top Video: The Gorilla in the Cellular Networks," IMC11, Nov. 24, 2011 [retrieved from the internet May 9, 2017 from URL: www.cs.columbia.edu/~lierranli/coms6998-7Spring2014/papers/videocellular_imc2011.pdf].
Montpetit et al. "IPTV: An End to End Perspective," Journal of Communications, May 2010, vol. 5, No. 5, pp. 358-373.
Xia et al. "A Survey on Software-Defined Networking," IEEE Communication Surveys & Tutorials, First Quarter 2015, vol. 17, No. 1, pp. 27-51.
International Search Report and Written Opinion for International (PCT) Patent Application No. PCT/US17/22432, dated Jun. 9, 2017, 13 pages.
International Preliminary Report on Patentability for International (PCT) Patent Application No. PCT/US2017/022432, dated Sep. 27, 2018 12 pages.
"Commercial Requirements for Companion Screen in the DVB-GEM Specification," DVB Organization, Apr. 2013, Version R 6.9.1, 40 pages.

* cited by examiner

SYSTEMS AND METHODS FOR ASSOCIATING COMMUNICATION DEVICES WITH OUTPUT DEVICES

CROSS-REFERENCE TO RELATED APPLICATIONS

This application claims the benefit of U.S. Provisional Patent Application Ser. No. 62/308,442, filed Mar. 15, 2016, and U.S. Provisional Patent Application Ser. No. 62/402,762, filed Sep. 30, 2016, the entire disclosures of which are hereby incorporated herein by reference.

FIELD

Systems and methods for associating or pairing communication devices with output devices are disclosed.

BACKGROUND

Increasingly, video entertainment, such as movies and television shows, is delivered to users on demand over digital networks. In addition, the distribution of content has expanded to include user devices, such as smart phones. These user devices have the ability to interface with content delivery systems and to output video and other content to users and various output devices. However, because of the need for mobility, the output capabilities of user devices are necessarily limited. Therefore, it is desirable to direct content streams associated with a user device to televisions or home theater systems.

Systems and methods currently available include those that involve establishing a dedicated connection between a user device and an output device. However, such dedicated connections can be limited by controls put in place by digital rights management systems. In addition, where multiple output devices are potentially available in the vicinity of the user device, selecting and using an appropriate output device can become problematic, particularly in a hotel or other hospitality or Multiple Dwelling Unit setting.

Further, in many hospitality settings, there is a desire to provide entertainment services to guests using applications and devices that are familiar to guests. Accordingly, making such entertainment services, such as Netflix® for example, available to the guest has proved to be difficult while maintaining security and implementing device isolation, which prevents user devices from discovering other devices. For example, Wi-Fi clients may be restricted from seeing other Wi-Fi devices. A requirement of device isolation thus conflicts with the desire to allow a user device to discover and make use of other Wi-Fi devices in the vicinity of the user device and further allow a user to do so using video entertainment applications familiar to the user. In addition, previous systems have lacked a way to connect devices on different sub-networks or nodes.

SUMMARY

Embodiments of the present disclosure are directed to systems and methods associating or pairing a user device to an output device. More particularly, embodiments of the present disclosure enable a user device to operably connect to an output device through a selected local player. In accordance with at least some embodiments of the present disclosure, a local player includes an app that is operable to request a pairing code from a network authority. The pairing code obtained by the local player can be displayed on an output device connected to the local player. A user can then enter the displayed pairing code into the user device, and send that code to a local server using an app. In accordance with other embodiments of the present disclosure, pairing can be completed without requiring that the user enter a displayed pairing code.

Further, embodiments of the present disclosure can enable a user device to operably connect to an output device through a selected local player, such as an over-the-top (OTT) device. In accordance with at least some embodiments of the present disclosure, a local player includes an app, or application, that is operable to display customized content at the direction of a user device. In addition, the app may be operable to request a pairing code from a network authority. The pairing code obtained by the local player can be displayed on an output device connected to the local player. A user can then enter the displayed pairing code into the user device, and send that code to a verification and/or authorization server using an app.

In accordance with embodiments of the present disclosure, in a hospitality setting, a user device must be registered with a system network controller (SNC) in order for the user device to send or cast content to an output device. Once the registration is complete, the user's device is paired with their current room, and casting may be enabled for any television in that room for compatible applications. The registration and pairing require certain pieces of information to be transmitted to the SNC server. The SNC server gets this information transmitted to it via web service calls/APIs from different external sources, depending on the registration method and site configuration. The SNC server maintains the pairing association between a user's device, room, and local players (e.g., Chromecast™ devices or "over-the-top" (OTT) devices) in that room until instructed to destroy that association. The SNC server may require identification information, such as a room number and/or IP and/or MAC address of the user's device in order to register that device and pair it with the local player or players in the user's (e.g., the guest's) room. Once a pairing is established, the SNC server forwards the correct network traffic between the paired user device and the local player in the guest room, allowing casting of content to the local player. The SNC server may maintain a table of local players in each room and create a lookup table of device MAC addresses paired with local players in each room at any given time. All web service calls to or from the SNC server may contain basic information such as date, time, a sequence/packet identifier, etc.

Additional features and advantages of embodiments of the present disclosure will become more readily apparent from the following description, particularly when taken together with the accompanying drawings.

DETAILED DESCRIPTION

Figure 1:
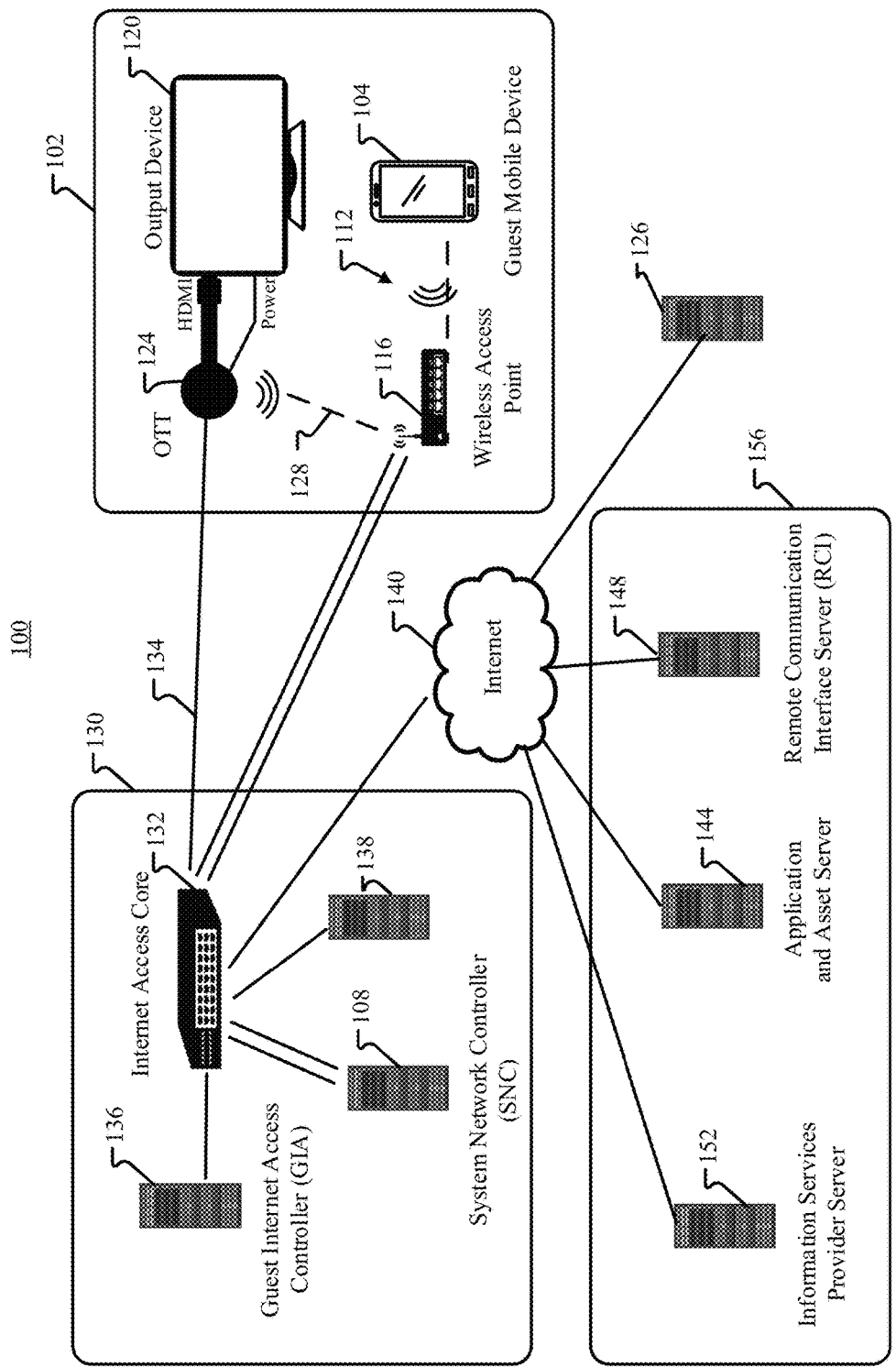
FIG. 1 is a block diagram depicting components of a system in accordance with embodiments of the present disclosure.

FIG. 1 is a block diagram illustrating a system 100 for enabling connectivity in accordance with embodiments of the present disclosure. The system 100 generally includes one or more user devices 104. As an example, but without limitation, a user device 104 may comprise a mobile device, such as a smart phone. As further examples, a user device 104 may comprise a tablet or a laptop computer. A user device 104 can connect to a system network controller (SNC) 108 through a first or guest communication network 112. As an example, but without limitation, the first communication network 112 may comprise a first or guest Wi-Fi network provided through one or more access points 116. For instance, an access point 116 may be provided for a particular guest room 102 or group of guest rooms. Access to the first communication network 112 by user device 104 can require entry of a valid room number, guest name, or other credential.

The system 100 also includes one or more output devices 120, for example televisions, each of which may be associated with a local player 124, such as a Chromecast™ or other over-the-top (OTT) device. The local player 124 can be connected to the output device 120 via an HDMI port. Power may be supplied to the local player 124 through a USB port associated with the output device 120. The USB port may be one that supplies power when the output device 120 is itself powered on, or can be configured to supply power continuously. In accordance with other embodiments, power may be supplied to the local player 124 through other means. For example, the local player 124 can be connected to a wall outlet. In accordance with embodiments of the present disclosure, the local player 124 may be connected to the SNC 108 through a second, hidden communication network 128. As an example, but without limitation, the second communication network 128 may comprise a second or system WiFi network that is associated with a hidden SSID. The second communication network 128 may be provided by the same or a different access point 116 than is used to provide the first communication network 112. In accordance with still other embodiments, the local player 124 can be connected to a wired network connection 134.

The SNC 108 may comprise a server computer, and may operate to perform registration functions with respect to devices, including but not limited to mobile devices 104, output devices 120, and local players 124. More particularly, the SNC 108 may maintain a table of information identifying such devices 104, 120 and 124, and associations between them. Moreover, upon the completion of registration, the SNC 108 pairs a user device 104 to a local player 124 and an associated output device 120, enabling the user device 104 to deliver content to the local player 124, and to have that content output through the output device 120. For example, the SNC 108 may operate to route content received from a user device 104 or from another source that is is sent on behalf of or at the request of the user device 104 to a paired local player 124. In an exemplary implementation, the SNC 108 is local to the local players 124 that are operated in association with the SNC 108. As used herein, local can include within the same building, complex, resort, or other geographically proximate area. In contrast, remote as used herein can include a geographically distant area, and/or a location that is geographically indistinct, such as in the cloud.

A system 100 in accordance with embodiments of the present disclosure can include various other devices and network nodes, located locally or remotely with respect to the output devices 120. For example, a local premises or hotel head end system 130 may be provided that includes the SNC 108, a local area network switch, router, an Internet access core 132, a guest Internet access controller (GIA) 136, and a property management system (PMS) 138. The network switch 132 may be associated with a wireless or wireline (e.g., Ethernet) network or networks. The GIA 136 can be provided as part of the head end system 130 for controlling and authorizing access to the first wireless network 112 by a user device 104, or other devices. The head end system 130 may generally include a control center for an entertainment system where various signals are brought together and monitored before being introduced into the local entertainment network. Accordingly, the reference to headend system 130 is not limited to video entertainment providers, such as cable TV systems, but may also or alternatively include various monitoring and control features associated with Internet access, wireless Internet access, output devices 120, local players 124, and other devices and services made available to a guest of a hospitality establishment. Various other devices may be connected to the head end system 130 via the Internet 140. Examples of such systems include a local player app and asset server 144, a network authority, such as a remote communication interface (RCI) server 148, and an information services provider server 152 residing at the same or different locations, such as location 156. Location 156 may be remote from the headend system 130, within the head end system 130, or on the hospitality or hotel premises. As a further example, the location 156 may comprise different locations in the cloud. In general, the app and asset server 144 may handle communications with apps running on local players 124. The RCI server 148 may comprise a cloud server that operates as a system authority, and performs operations that include creating pairing codes that are returned in response to a request to initiate a pairing between a output device 120 and a user device 104, directly or through a local player 124. The information services provider server 152 may provide information, such as but not limited to, hospitality-related, guest-related, and/or locally-related content to the local player 124 and/or the SNC 108. In accordance with still other embodiments of the present disclosure, the system 100 can include or be associated with a content source 126 from which a user device 104 can access content for casting to an output device 120 connected to the user device 104 as described herein.

In accordance with at least some embodiments of the present disclosure, pairing between a user device 104 and an output device 120 is performed in connection with a request for a pairing code that is entered through interaction of a guest or other user with a menu system displayed by the output device 120, and that is operated in connection with an on-site host provided as part of the head end system 130. For example, a particular implementation of an SNC 108 or an additional head end system 130 server which is operable to provide on-demand or other programming and interactive television functions via an output device 120 that is local to the head end system 130 can provide the menu system that enables a user to request a pairing code. When the user selects a menu item in the interactive television system to request a pairing between the user device 104 of the user and the output device 120, the head end system 130 makes a request for a pairing code that is created by a web service call to the RCI server 148. The information sent to the RCI server 148 to generate the pairing code may include a site identifier, a guest identifier, a local player 124 identifier, and/or a TV terminal or other output device 120 identifier where the code was requested from. The pairing code is returned from the RCI server 148 to the head end system 130, which displays it to the guest via the television (i.e., the output device) 120.

The displayed code is then entered by the guest into a connectivity app that is running on the user device 104, which provides connectivity to the RCI server 148. More particularly, the connectivity app on the user device 104 transmits the code along with the IP/MAC address information needed for association of the user device 104 with the output device 120 and the associated local player 124 by the SNC 108. The user device 104 is then registered with the SNC 108, which includes recording an association between the user device 104 and the output device 120 in a table maintained by the SNC 108. More particularly, the SNC 108 may use the room number and IP/MAC address of the user device 104 to create a pairing between the local player 124 in the guest room and the user device 104. The pairing is dissolved when the SNC 108 receives a checkout message from the site's property management system (PMS) 138. More particularly, when the checkout message is received, the PMS 138 may make a web service call to the SNC 108 to dissolve all device pairings in a room. If a PMS 138 is not operable to send messages to the SNC 108, the head end system 130 can operate such that all users (i.e. guests) are checked out at a specific time each day, at which time all pairings between user devices 104 and local players 124 for all rooms are dissolved.

In accordance with still other embodiments of the present disclosure, pairing can be performed without requiring an interactive television system running through a local head end system 130. Instead, pairing can be performed in connection with an SNC 108 and an application running on a local player 124 that interacts with the RCI server 148. The app on the local player 124 can be launched via a command from the SNC 108 when the SNC 108 detects that a local player 124 has powered up. A local player app or application, such as a default app that loads at power up, makes a web service call to the local SNC 108 to get information regarding what room and site the local player 124 is installed in. The information sent from the SNC 108 to the local player 124 also contains the URL for what app, such as a second app, the local player 124 is to launch. Once this information is retrieved, the local player app calls the specified URL and loads the requested application from a server. The URL for the requested application may point to the application and asset server 144, the information services provider server 152, the SNC 108, and/or another server providing or otherwise serving an app to the local player 124. The app running on the local player 124 then communicates, for example via a web service call, with the RCI server 148 to generate a pairing code. The information sent to the RCI server 148 to generate the pairing code includes a site identifier and room number where the code was requested from. The RCI server 148 generates the pairing code and returns it to the app running on the local player 124.

The local player 124 then displays the received pairing code on the output device 120 to the user. The pairing code can be generated on a timed basis, refreshed by an API call, or other criteria. The user then enters the code into the connectivity app running on the user device 104. The connectivity app transmits the pairing code entered by the user, along with the IP/MAC address information needed to allow the SNC 108 to associate the user device 104 with the local player 124, to the RCI server 148. The RCI server 148 makes a web service call to the SNC 108, passing the information from the user device 104 to the SNC 108. The SNC 108 uses the room number and IP/MAC address of the user device 104 to create a pairing between the local player or players 124 in the guest room and the user device 104. Optionally, the app running on the local player 124 can continue to display the pairing code after a user device 104 has been paired, to enable other devices 104 to be paired to the local player or players 124. In addition, the app running on the local player 124 can provide an indication to the user that pairing has been successfully completed.

A flag can be set in the SNC 108 to dissolve all pairings at the site at a scheduled time each day. Alternatively, the property management system 138 can make a call to the SNC 108 to dissolve a pairing for a particular room at a selected time. As yet another option, the PMS 138 can make a web service call to the SNC 108 to dissolve a pairing associated with a particular user when that user checks out of their room.

In accordance with other embodiments of the present disclosure, pairings can be completed in association with an app running on a user device 104 that is not associated with the head end system 130 or the RCI server 148. That is, a "third-party" app running on the user device 104 can be configured to provide necessary information to the RCI server 148 in order to start the device registration and pairing process. The information provided by the app can include a site identifier, room number, guest device 104 Wi-Fi IP, and/or MAC address. The RCI server 148 makes a web service call to the SNC 108, passing the information from the user device 104 to the SNC 108. The SNC 108 uses the room number and IP/MAC address of the user device 104 to create a pairing between the local player 124 in the guest room and the user device 104. Accordingly, the user never has to enter a pairing code. In a typical implementation, the third-party app is an app provided by the hotel offering connectivity to televisions or other output devices 120 in guest rooms. In accordance with at least some embodiments, a user is required to enter items of information, such as room number, hotel rewards program login credentials, or other information. A pairing thus established can be dissolved through a web service call/API. For example, upon checkout from the room, the third-party app can pass a site identifier and room number to the RCI server 148. The RCI server 148 makes a web service call to the site's SNC 108 passing the room number information. The SNC 108 uses the room number to cancel all pairing associations between a room and all user devices 104 assigned to that room and previously paired. If the third party app does not implement the web service call to dissolve pairing, the pairing can be dissolved through a message sent from a property management system 138, the pairing can be dissolved at a specific time each day, or pairing can be dissolved manually through a command entered by the user.

In accordance with still other embodiments of the present disclosure, pairing can be completed in association with a guest Internet access (GIA) login. In particular, when a user signs on to a guest Internet access system 136, for example provided by a hotel, hospitality facility, or multiple dwelling unit facility, that GIA system 136 is aware of the user device's 104 IP and MAC addresses. Most GIA systems 136 are also aware of the guest room number for identity validation or property management system integration purposes. At the time of signing in, the GIA system 136 sends site identifier, room number, and guest device Wi-Fi IP and/or MAC address to the RCI server 148, via a web service call/API. The RCI server 148 in turn makes a web service call to the correct site's SNC 108, passing the information from the GIA server 136 about the guest's device 104 to the SNC 108. The SNC 108 uses the room number and IP/MAC address of the user device 104 to create a pairing between the local player 124 in the guest room and the user device 104. In addition to providing convenient pairing of a user device 104 in the form of a smart phone, such embodiments also enable laptop computers, tablets, or other devices that may support casting through the chrome browser or other applications to an output device 120.

The GIA system 136 can disconnect a user device 104 from the system 100 by providing the RCI server 148 with an identification of the user device 104 upon guest checkout or other dissolution of a user device's 104 association with a local player 124. In response, the RCI server 148 makes a web service call to the SNC 108 for the site, passing the room number information. The SNC 108 uses the room number to cancel all pairing associations between the room and user devices 104 assigned to that room, and in particular to all local players 124 with which the user device 104 had been paired. Alternatively, a checkout message from a PMS, automatic dissolution at a scheduled time each day, manual guest dissolution, or other options for dissolving a pairing can be implemented. As yet another alternative, the GIA 136 can make a web service call to the SNC 108 directly in order to dissolve an association between a user device 104 and a local player 124.

In accordance with still other embodiments, a web service/API to request all devices currently registered for a guest Internet system can be polled when the SNC controller 108 detects that a local player 124 is being powered on, to determine if there are any user devices 104 currently assigned to that room. Information regarding such user devices 104 returned by the GIA system 136 can be used by the SNC 108 to match the user devices 104, by room number, to the appropriate local player or players 124. This polling could be performed periodically, for example where local players 124 are powered on continuously. Pairings can be dissolved when validation checks, for example performed when a local player 124 boots up, determine that a formerly valid user device 104 is no longer associated with the GIA system 136.

In accordance with at least some embodiments of the present disclosure, the SNC 108 can be configured to point at a defined Web service and broadcast helpful messages to that service. A "casting started" and "casting ended" method could be broadcast when a user starts casting content and when they stop casting. This would allow a third-party provider or system to appropriately tune the television, or set-top box associated with an output device 120. A user can then perform casting through selecting a casting icon in a selected content app. Upon making such a selection, a DRE server or set-top box listening for such events could perform the necessary tuning to the appropriate HDMI input. In such embodiments, information maintained by the SNC 108 can include a field identifying, for each local player 124, a unique identifier for an associated set-top box or tuner. This information can be passed as part of the broadcast messages. Alternatively or in addition, a master flag can be set on a per room basis to indicate whether a room is available for casting, locked to a currently paired device 104, or to implement protocols to charge a fee before casting can be initiated.

In accordance with still further embodiments of the present disclosure, the system 100 can implement app blocking. In particular, the system 100 can control or limit the apps that can be run in connection with a pairing between a user device 104 and a local player 124. For example, apps that may be disruptive, such as a local player configuration app or an unspecified Torrent app, can be blocked by refusing to answer a request by a user device 104 to launch those apps. This prevents the user from changing the local player 124 settings, or from running potentially unfriendly apps. In accordance with at least some embodiments, blocking can be implemented by having the SNC 108 block the ability to send web calls to the local player 124 via a specific TCP port on the local player 124 that is used by a configuration app. In addition, or alternatively, white lists, black lists, and the like can be used.

A system 100 in accordance with embodiments of the present disclosure can also include or be associated with a content provider server 126. The content provider server 126 may be operable to provide content, such as but not limited to streaming video, music, text or other content, to a user device 104 over a network, such as the Internet 140. Content available from a content provider server 126 may be accessed through a content provider app, a browser, a browser plug-in or other programming that enables or facilitates obtaining content from a content provider server 126. In addition to providing a user interface, the content provider app or other programming may store credentials needed to access content from the associated content provider server 126. One example of content from a content provider server 126 is a subscription service, such as Netflix™.

Figure 2:
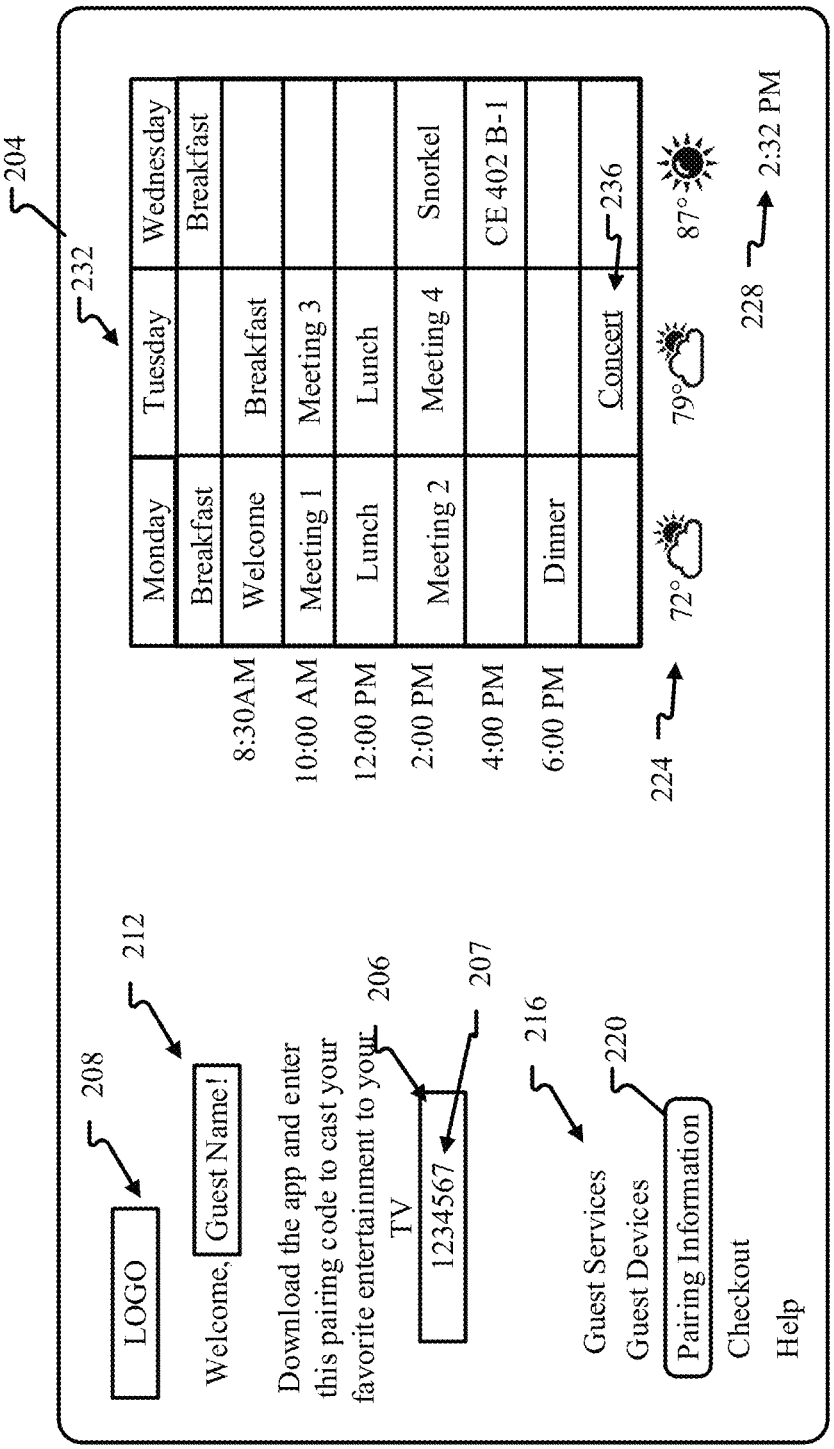
FIG. 2 depicts a display of customized content in accordance with embodiments of the present disclosure.

FIG. 2 is an example of a default or welcome screen or display 204 presented at the output device 120 in accordance with embodiments of the present disclosure. In instances where the local player 124 is not being used, or in instances when the local player 124 is powering on, the welcome screen 204 may be the first, or otherwise give the impression of being the first, content displayed by the output device 120. In accordance with embodiments of the present disclosure, the welcome screen can include a pairing code field 206 that presents a pairing code 207 to a user. The presentation of a pairing code 207 can be automatic such that is present whenever the welcome screen 204 is displayed. A pairing code 207 can also be presented by a pairing code field 206 as a result of a command entered through the local player 124.

The default or welcome display 204 may include hospitality branding content 208, such as a logo. The hospitality branding content 208 may be provided from the SNC 108, the information services provider 152, the application and asset server 144, and/or another server accessible to the SNC and/or local player 124. The default or welcome display 204 may include guest information 212, such as a guest name and/or guest schedule 332. The guest information 212 may be provided from the SNC 108, the information services provider 152, the application and asset server 144, or another server accessible to the SNC 108 and/or local player 124. The default or welcome display 204 may include an interactive content section 216, which may allow a user to interact with, control, or otherwise participate in the welcome display 204. For example, a guest may move a selection box from a first position to pairing information 220; selecting pairing information 220 may display information regarding an active or available pairing between a user device 104, and a local player 124 in the room 102. The user or guest may use a remote or an app to move the selection box in FIG. 2. Alternatively, or in addition, the entirety or portions of the interactive content section 216 may not be interactive at all; instead, the interactive content section 216 may display actual pairing information and/or an actual listing of guest devices. The guest information 212 may be provided from the SNC 108, the information services provider 152, the application and asset server 144, and/or another server accessible to the SNC 108 and/or local player 124.

The default or welcome display 204 may include local information 224 that is local to the hospitality services provider. For example, the local information 224 may include, but is not limited to, weather information. The local information 224 may be provided from the SNC 108, the information services provider 152, the application and asset server 144, and/or another server accessible to the SNC 108 and/or local player 124. As previously discussed, the guest information 212 may include a guest schedule 232 and the guest schedule 232 may include information provided from the SNC 108, the information services provider 152, the application and asset server 144, and/or another server accessible to the SNC and/or local player 124. The guest schedule 232 may additionally include information obtained from or provided by the user device 104. For example, the user device 104 may grant access to the information services provider server 152 for example. Calendar events, contacts, and other information may then be requested by the local player 124 via a web services call such that the local play 124 can assemble and then display such information at the output device 120. In some instances, the schedule 232 may include links, such as a link 236 that provides additional information associated with one or more information content pieces within the schedule 232. Importantly, the default or welcome display 204 is launched and displayed on the output device with no guest interaction. That is, when the local play 124 is not in use and/or when the local player 124 is powered on, the default or welcome display 204 is displayed at the output device 120.

Figure 3:
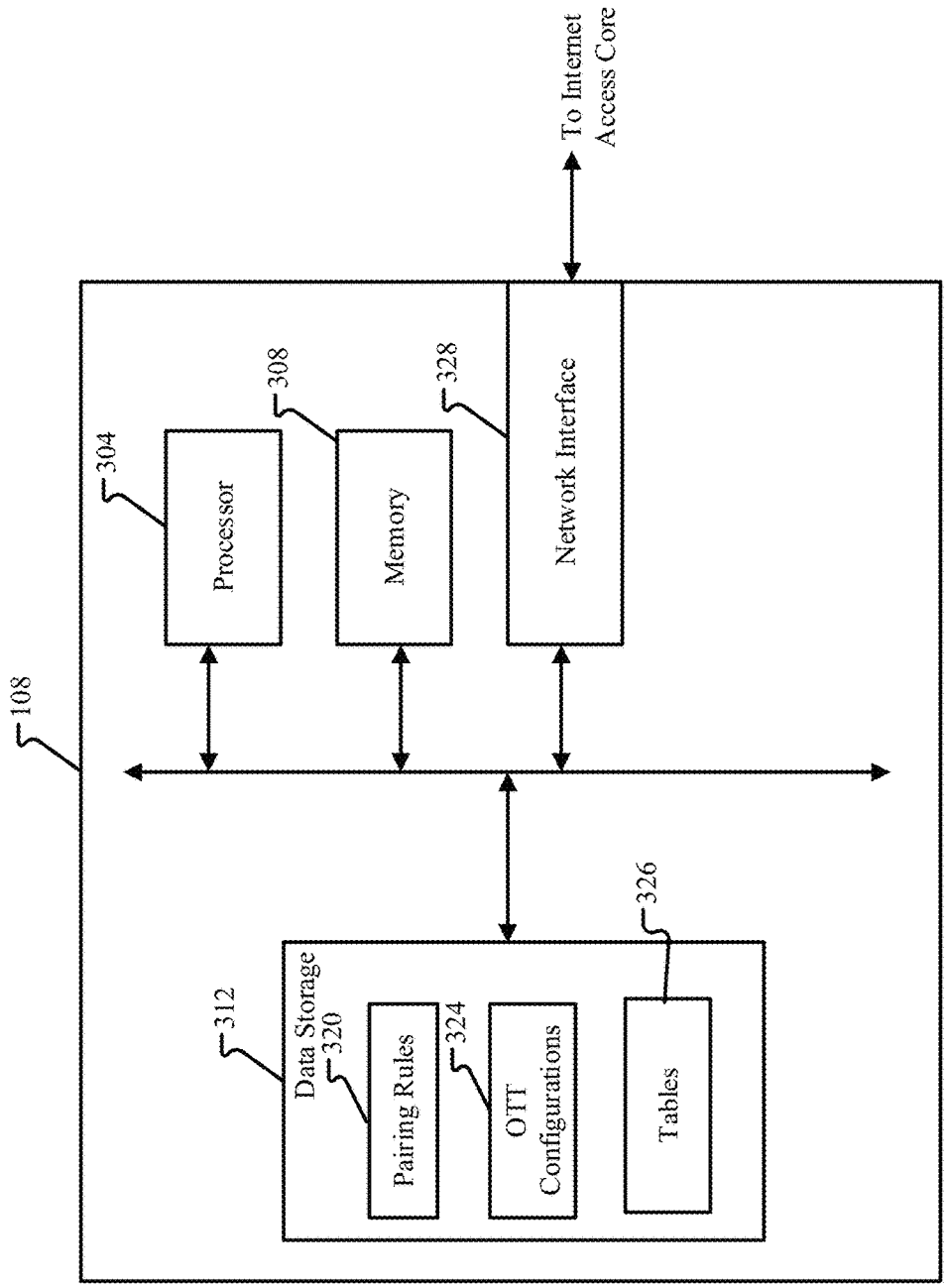
FIG. 3 depicts aspects of a system network controller (SNC) in accordance with embodiments of the present disclosure.

FIG. 3 is a block diagram illustrating components of a system network controller (SNC) 108 in accordance with embodiments of the present disclosure. In general, the SNC controller 108 may be implemented as a server computer, and may include a processor 304 and memory 308. The processor 304 may comprise a general purpose programmable processor or controller for executing application programming or instructions. As a further example, the processor 304 may comprise a specially configured application specific integrated circuit (ASIC). The processor 304 generally functions to run programming code or instructions, such as applications or programs, implementing various functions of the SNC 108. The memory 308 is generally used in connection with the execution of application programming by the processor 304 and for the temporary or long-term storage of program instructions and/or data. As examples, the memory 308 may comprise removable secure digital storage, RAM, SDRAM, or other solid-state memory.

The SNC 108 can also include data storage 312. In accordance with embodiments of the present invention, data storage 312 can contain program code or instructions implementing various applications or functions executed by the SNC 108. Like the memory 308, the data storage 312 can comprise a solid-state memory device. In addition, in certain applications, the data storage 312 can be integrated with and/or indistinguishable from the memory 308. Alternatively, or in addition, the data storage 312 may comprise a hard disk drive or other random access memory and/or can be interconnected to the communication server 112, for example as network attached storage. Programming or modules stored in the data storage 312 and executed by the processor 304 can include, as examples and without limitation, various pairing rules 320, various local player 124 configurations 324, and one or more tables 326. For example, the local player configurations 324 may include a table containing mapping information associating or pairing one or more local players 124 to one or more user devices 104, one or more specific apps running on a user device 104, one or more content providers 126, and/or one or more URLs. The SNC 108 may also include one or more communication interfaces 328. For example, a communication interface 328 can provide a connection to local or on-site communication networks 116, 128, and/or 134, and to the Internet 140, for example through a connected Internet access core 132.

Figure 4:
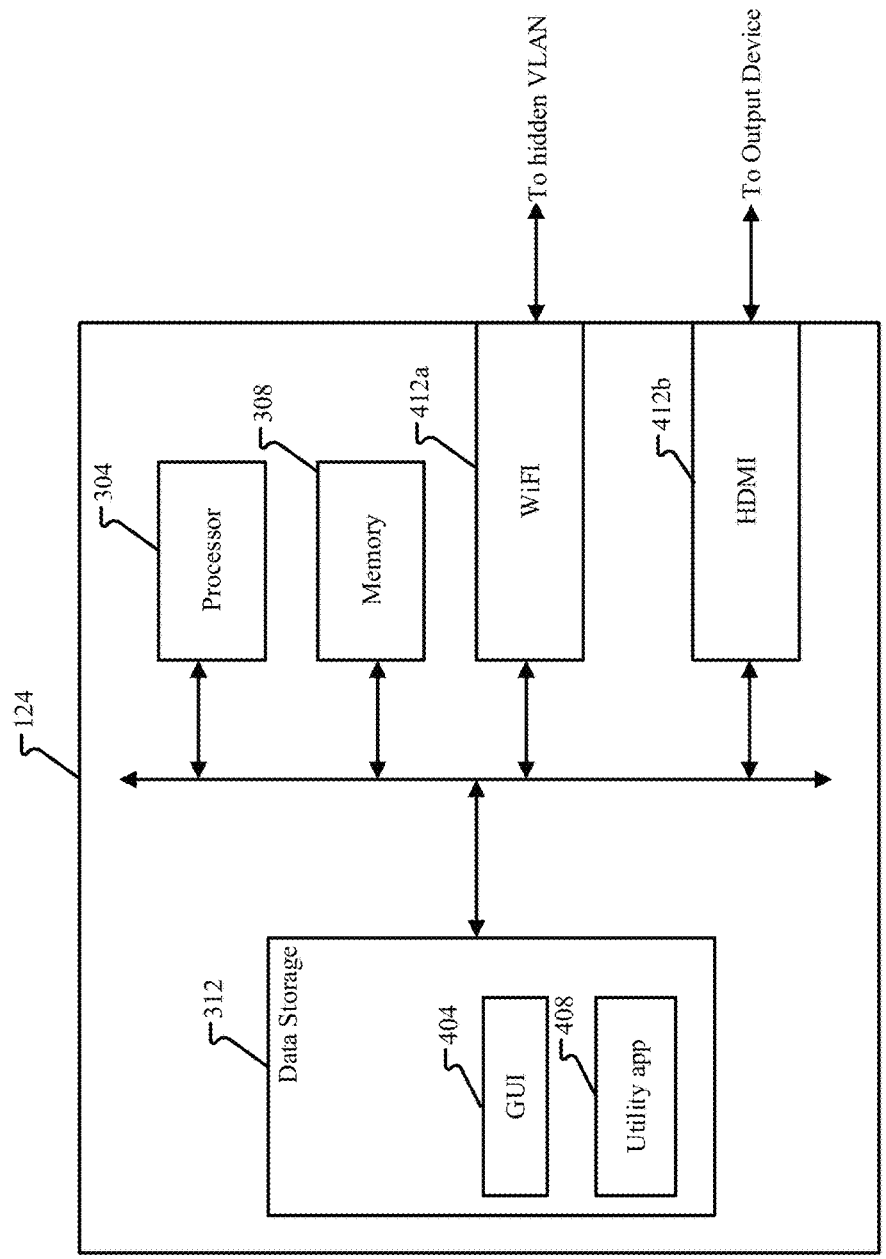
FIG. 4 depicts aspects of an over-the-top device (OTT) in accordance with embodiments of the present disclosure.

FIG. 4 is a block diagram illustrating components of a local player 124 in accordance with embodiments of the present disclosure. Like the SNC 108, the local player 124 can include a processor 304, memory 308, and/or data storage 312. Program code or instructions that can be stored in data storage 312 and executed by the processor 304 in connection with the memory 308 can include, but is not limited to, a graphical user interface (GUI) 404. As an example, the GUI 404 can operate to present a welcome screen 204 on an attached output device 120. The GUI 404 can incorporate or operate in conjunction with a browser functionality. Alternatively or in addition the local player 124 can include a utility application or browser 408 that is directed to a web page stored on an external device, such as the application and asset server 144, or on another connected device, such as the SNC 108. As discussed elsewhere herein, a browser 408 can be directed to a web page specified by the SNC 108 when the local player 124 is powered on or restarted. In addition, the local player 124 may include one or more communication interfaces. For example, a first communication interface 412a may comprise a WiFi interface connecting the local player 124 to a network 128, such as a hidden VLAN connecting one or more local players 124 to the Internet access core 132. As a further example, a second connection interface 408b may comprise an HDMI directly connecting the local player 124 to an output device 120.

Figure 5:
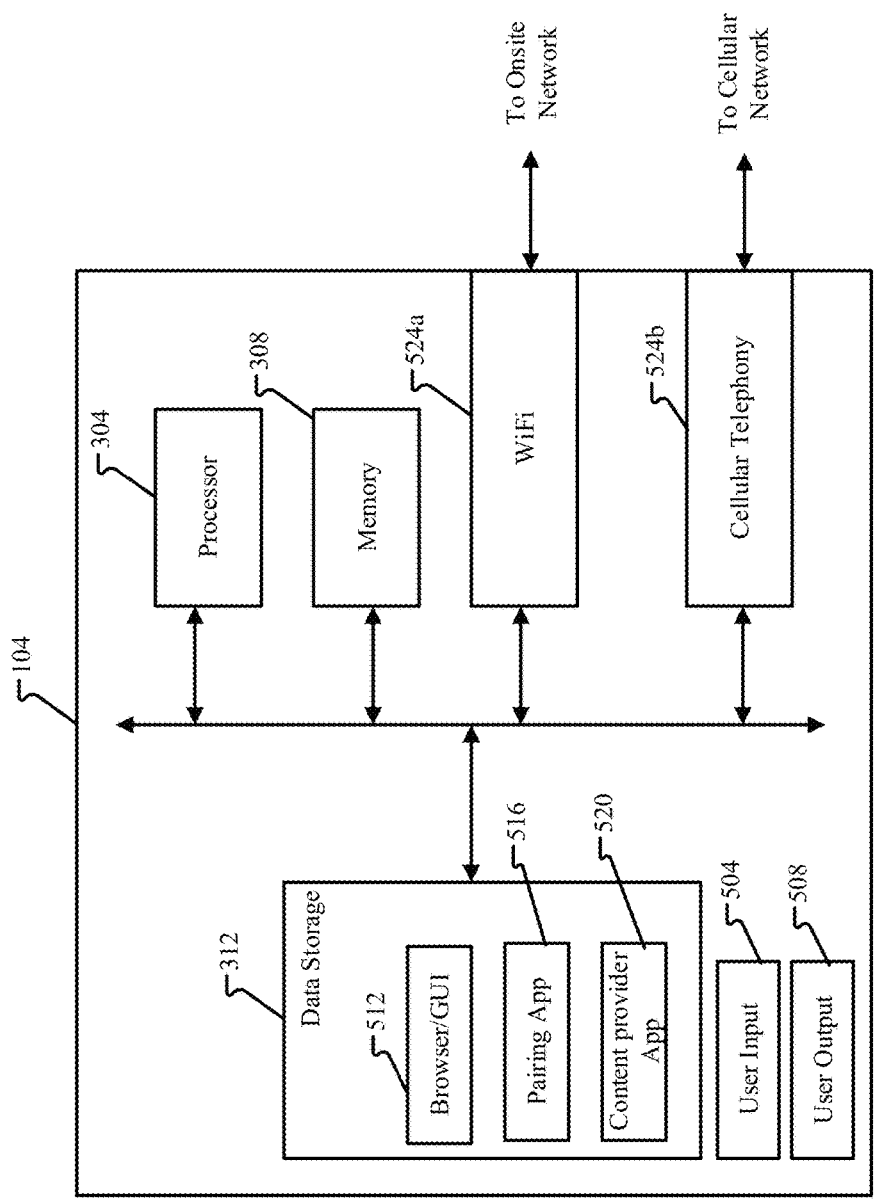
FIG. 5 depicts aspects of a user device in accordance with embodiments of the present disclosure.

FIG. 5 is a block diagram illustrating components that can be included in a user device 104 in accordance with embodiments of the present disclosure. In general, and like the SNC 108 and the local player 124, the user device 104 can include a processor 304, memory 308, and/or data storage 312. The user device 104 can also include one or more user inputs 504 and one or more user outputs 508. For instance, the user device 104 can include a touch screen display that performs functions of a user input 504 and a user output 508. Program code or instructions that can be stored in data storage 312 and executed by the processor 304 in connection with the memory 308 can include, but are not limited to, a browser 512, pairing app 516, and content provider app 520. The user device 104 can also include various communication interfaces, such as a WiFi interface 524a and a cellular telephony interface 524b.

Figure 6:
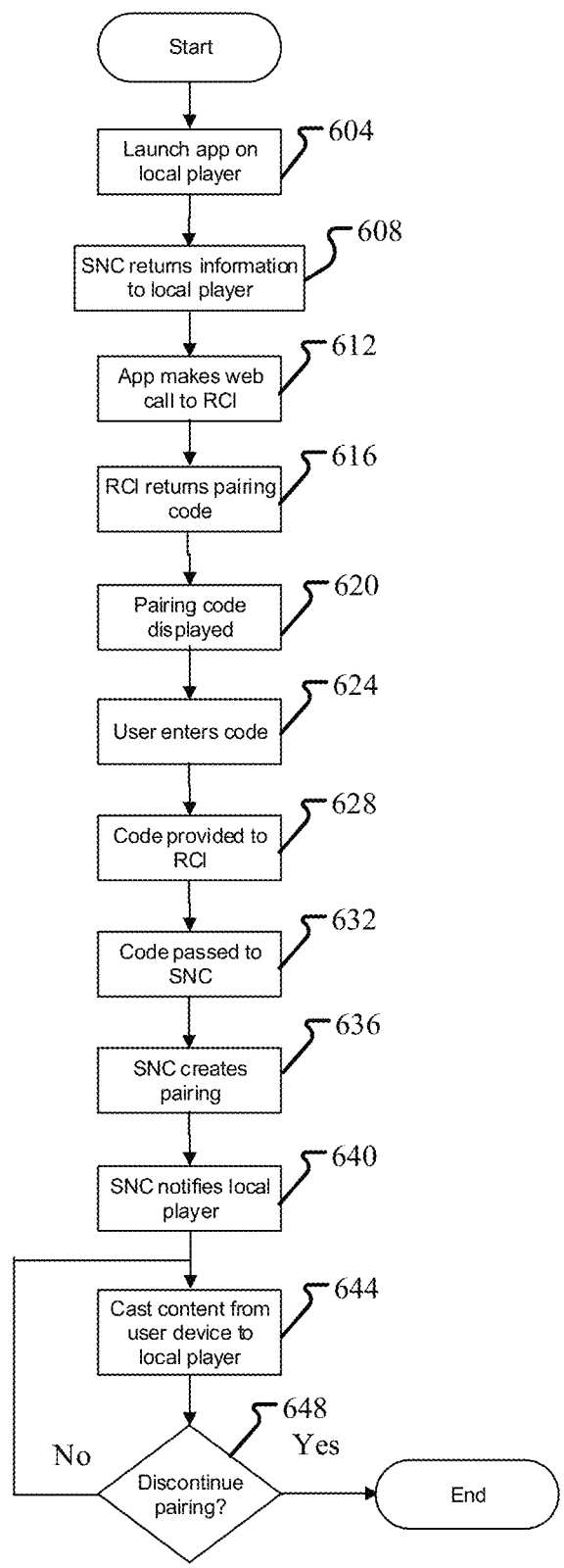
FIG. 6 depicts a process for pairing a user device to an output device in accordance with embodiments of the present disclosure.

FIG. 6 depicts aspects of the operation of a system for selecting and delivering content 100, and in particular operation of the system 100 in connection with pairing a user device 104 to an output device 120. Initially, at step 604, an app running on the local player 124 is launched. The app can comprise a GUI 404 or a specially provided utility app 408, and can present an interface to the user through a display of an output device 120 that is directly connected to the local player 124, for example through an HDMI port on the output device 120. The app 404 or 408 makes a web service call to the SNC 108, which returns various information to the local player 124 (step 608). This information can include information about the particular room 102 and site (e.g. hotel or multiple dwelling unit facility) that includes the local player 124.

The app 404, 408 then makes a web call to the RCI server 148 (step 612). The RCI server 148 generates a pairing code 207, which is returned to the app 404, 408 (step 616). The app 404, 408 then displays the pairing code 207 on the output device 120 for the guest (step 620). As an example, the pairing code 207 can be presented to the user as part of a welcome screen 204. The RCI server 148 can generate the pairing code 207 on a timed basis, refreshed by an API code, or on some other basis. The pairing code 207 is then entered by the user into a pairing app 516 running on the user's device 104, or into a browser 512 running on the user device 104 that has been directed to a pairing page for the system 100 (step 624). The pairing code 207 is transmitted from the user device 104, along with the IP and/or MAC address of the user device 104, to the RCI server 148 (step 628). The RCI server 148 then makes a web service call to the SNC 108, passing the information from the user device 104 to the SNC 108 (step 632).

The SNC 108 applies the room number and the IP and/or MAC address of the user device 104 to create a pairing between the local player or players 124 in the room 102 of the user of the user device 104 (step 636). A record of this pairing can be maintained in a table 326 on the SNC 108. The SNC 108 can also direct the app 404, 408 on the local player 124 to continue to display the pairing code 207, which facilitates the association of additional user devices 104 with the local player 124, and/or the SNC 108 can provide a message for display by the app 404, 408 indicating to the user that the user device 104 has been paired to the local player 124 (step 640). Content from or in association with the user device 104 can then be cast to the local player 124 and on to the output device 120 (step 644). The content can be content that is obtained from a content provider server 126, for example through use of a content provider app 520 running on the user device 104. Content can also be obtained from another external resource, or from the user device 104 itself. The SNC 108 can direct content from the user device 104, and/or from a content provider 126 providing content in response to an instruction from the user device 104, to the paired local player or players 124. In particular, in response to receiving content associated with a particular user device 104, the SNC 108 can reference the table 326 of pairing information to identify a local player 124 associated with that user device 104, and can then direct the content to that identified local player 124. Content received at the SNC 108 that is not associated with a user device 104 that has been paired to a local player 124 is not passed on to any local player 124.

At step 648, a determination can be made as to whether the pairing relationship between the user device 104 and the local player 124 should be dissolved. For example, all pairings at a specific hotel or other multiple unit dwelling facility can be dissolved at a particular time each day. As another example, a pairing between a particular user device 104 and a local player 124 can be dissolved when a guest associated with the user device 104 checks out of their room. For example, through an interface with a property management system (PMS) 138, the SNC 108 could discontinue a pairing relationship on a signal from the PMS 138 that a guest associated with a user device 104 has checked out. As yet another alternative, a pairing could be dissolved in response to a command entered by the user through the pairing app 516 running on the user device 104. If the pairing is to be discontinued, the process can end. Alternatively, the user device 104 can continue to cast content to an output device 120 through the paired local player 124.

In accordance with embodiments of the present disclosure, pairings between multiple user devices 104 and local players 124 can be maintained in one or more tables 326 by the SNC 108. In a typical implementation, each user device 104 is paired to a unique local player 124 or set of local players 124. Accordingly, sharing of local players 124, and thus of output devices 120, is prevented.

In accordance with still other embodiments, pairing can be performed in association with an app or service 516, for example running on a user device 104, that provides information to the RCI server 148 regarding the site, room, and a guest identifier, such as a Wi-Fi, IP, or MAC address. The RCI server 148 then makes a web service call to the SNC 108, passing the information from the user device 104 to the SNC 108. The SNC 108 uses the room number and the address information for the user device 104 to create a pairing between the local player or players 124 in the user's room and the user device 104. In this embodiment, the user is not required to enter a pairing code. In accordance with embodiments of the present disclosure, the app 516 running on the user device 104 can be one that is provided by a hotel or other multiple dwelling unit facility, or a third party that is linked to the hotel or other facility. The pairing can be dissolved by passing identifying information, such as a site identifier and room number, to the RCI server 108 when the user associated with the user device 104 checks out of their room. The RCI server 108 then makes a web service call to the SNC 108 at the site, passing the room number information. The SNC 108 then uses the room number to cancel all pairing associations between local players 124 in the room and all user devices 104 assigned to the room. As other alternatives, dissolution of the pairing can be implemented in response to receipt of a check out message or flag indicating that a pairing should be dissolved by the SNC 108.

In accordance with other embodiments of the present disclosure, the pairing of a user device 104 to a local player 124 can be completed in association with guest internet access provided at a location. For example, a GIA controller 136 associated with a system 100 can provide a list of all user devices 104 currently registered for guest Internet access to the SNC 108 in response to a web service call/API query requesting that information. Any user devices 104 discovered as part of that request are then added to the SNC 108, and the SNC 108 can then match the newly discovered user devices 104 to the local player or players 124 in the rooms associated with the user devices 104. Requests for such information can be issued periodically from the SNC 108. Any pairings previously created that are no longer detected when the GIA controller 136 is polled can be dissolved by the SNC 108.

In accordance with still other embodiments of the present disclosure, a user device 104 can pair to a local player 124 without requiring that the user device 104 execute a specialized app, and without requiring input from a GIA system 136. In such an embodiment, the local player 124 can execute a GUI 404 or a utility app 408 that sends a request for information to the SNC 108, for example through a web service call. The SNC 108 then returns information regarding the site identifier and room number at which the local player 124 is located. The information can also identify a Wi-Fi SSID for use by a user device 104. The information can be included in a pairing token, such as a JSON Web Token (JWT), that is signed by the SNC 108. The local player 124 then sends the token on to the RCI server 156. In exchange, the RCI server 156 sends a pairing code 207 back to the local player 124. The pairing code 207 can then be displayed as part of a welcome screen or page 204 that is displayed to a user (guest). The welcome screen 204 can also include a URL and an instruction to the user to navigate to the URL on the user device 104 in order to initiate the pairing process. In accordance with at least some embodiments, the link can include the pairing code 207. When the user follows the link, a web-based pairing app is returned, which can be customized for the SNC 108 at the site of the local player 124. The return of the pairing code 207 to the RCI server 148 when the link is followed also causes the RCI server 148 to obtain the token that was sent to the RCI server 148, and to provide the token or information contained in the token to the user device 104. In addition, at the user device 104, a web page can be displayed that provides information to the user, and/or that allows the user to make one or more selections, such as a language selection. The web-based pairing app can then initiate a pairing request to the SNC 108. Initiating the pairing request can include sending the token to the SNC 108 as a means of authenticating that the user has physical access to the local player 124 and associated output device 120 that was displaying the pairing code. If the SNC 108 is able to confirm that it created the token, it will proceed with associating the user device 104 with the local player 104, and allow the user device 104 to cast content to the local player 124. In addition, the SNC 108 can record the pairing of the user device 104 and the local player 124 in the table 326 maintained on the SNC 108.

Accordingly, embodiments of the present disclosure provide for pairings between user devices 104 and local players 124 to be established and torn down flexibly and conveniently. Device isolation is maintained, and only user devices 104 associated with a particular room or authorized area are paired to local players 124 in that room or area.

The foregoing discussion of embodiments of the present disclosure has been presented for purposes of illustration and description. Further, the description is not intended to limit the disclosure to the particular embodiments disclosed herein. Consequently, variations and modifications commensurate with the above teachings, within the skill or knowledge of the relevant art, are within the scope of the present disclosure. The embodiments described hereinabove are further intended to explain the best mode presently known of practicing the various embodiments and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for pairing a user device to an output device, comprising:
   launching an app on a local player;
   in response to being launched, the app making a web service call to a local server;
   in response to the web service call to the local server, the local server returning information to the local player, wherein the information includes an identification of a room in which the local player is located;
   after the information is returned from the local server, the app making a web service call to a network authority;
   in response to the web service call to the network authority, the network authority providing a pairing code to the local player;
   entering the pairing code in an app running on a user device;
   in response to receiving the pairing code from the user device, providing an identifier of the user device from the network authority to the local server;
   in response to receiving the identifier of the user device at the local server, the local server applying the identifier of the user device and the identification of the room in which the local player is located to create a pairing between the user device and the local player, wherein following the pairing the user device can output content through the output device connected to the local player.

2. The method of claim 1, wherein the pairing code is requested from the network authority after the local player has obtained the information regarding a location of the local player.

3. The method of claim 2, further comprising:
   the network authority generating the pairing code after receiving the request from the local player.

4. The method of claim 3, further comprising:
   displaying the pairing code by an output device connected to the local player.

5. The method of claim 4, further comprising:
   maintaining a table on the local server, wherein the table includes a record of the pairing between the user device and the local player.

6. The method of claim 5, further comprising:
   casting content from the user device to the local player, wherein the content is directed to the local player associated with the user device by the local server.

7. The method of claim 6, wherein the content that is cast to the local player is obtained from a content provider server.

8. The method of claim 6, wherein the content that is cast to the local player is obtained from the user device.

9. The method of claim 5, wherein the table includes a record of pairings between other local players and local devices.

10. The method of claim 8, further comprising:
    discontinuing the pairing between the user device and the local player.

* * * * *